May 5, 1959 J. K. SEVCIK 2,884,759
COMBUSTION CHAMBER CONSTRUCTION
Filed April 25, 1956
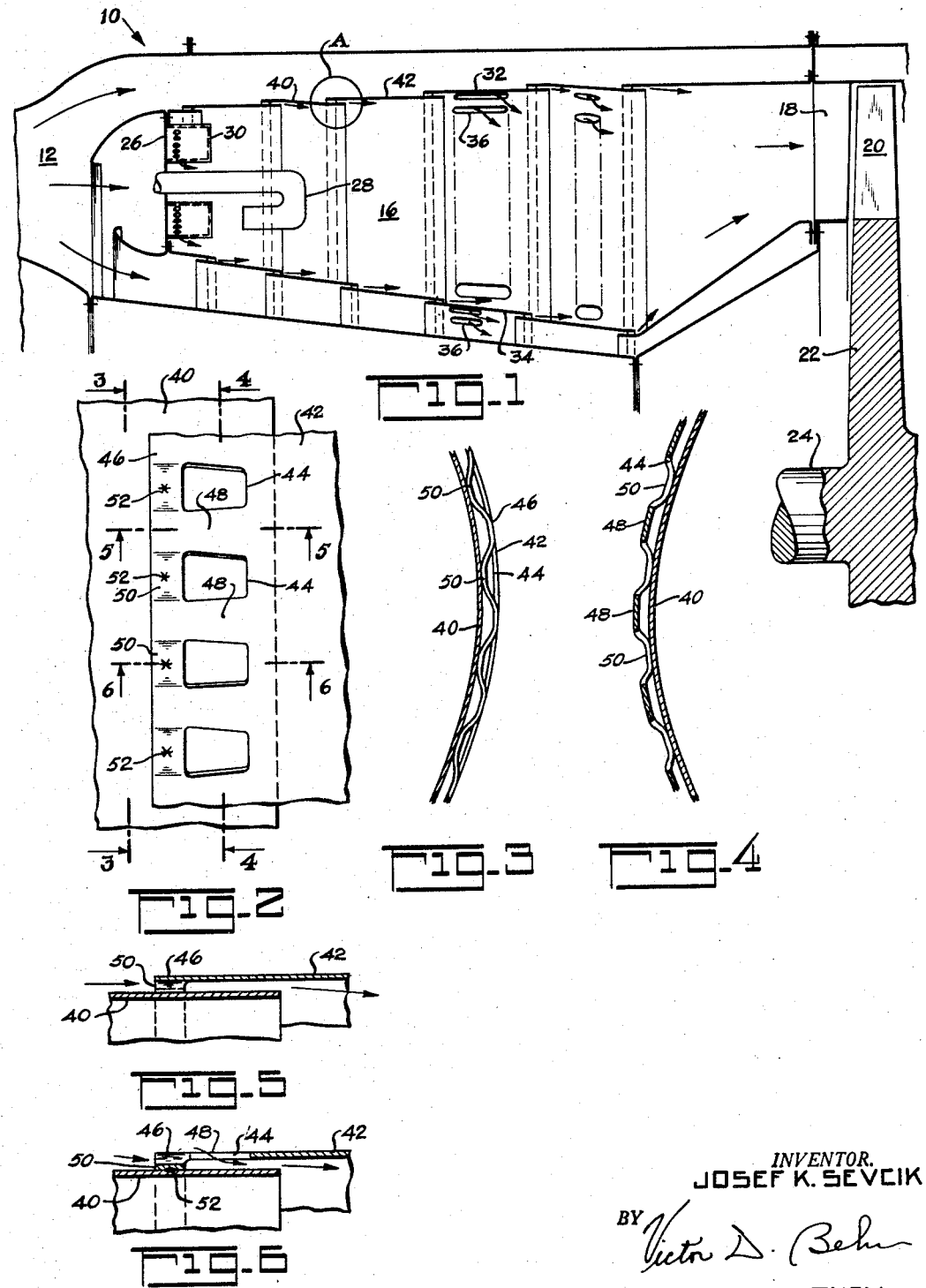
INVENTOR.
JOSEF K. SEVCIK
BY
ATTORNEY

United States Patent Office 2,884,759
Patented May 5, 1959

2,884,759

COMBUSTION CHAMBER CONSTRUCTION

Josef K. Sevcik, Oradell, N.J., assignor to Curtiss-Wright Corporation, a corporation of Delaware Application April 25, 1956, Serial No. 580,488

1 Claim. (Cl. 60—39.65)

This invention relates to combustion chambers and is particularly directed to combustion chambers for jet engines.

A known form of combustion chamber for aircraft jet engines comprises a plurality of serially disposed annular wall or liner members forming the walls of said chamber, said members having their adjacent ends overlapping in a telescopic-like manner with said ends being of different diameter to admit air into the chamber from an air duct surrounding said chamber. The overlapping ends of the annular wall members are rigidly connected together by spacing means without preventing said air flow between said overlapping ends. During engine operation the temperature of adjacent combustion chamber wall members may differ materially. This fact coupled with the rigidity of the connection between the overlapping ends of the combustion chamber wall members in prior constructions results in high stresses in said members adjacent said connection which may be so high as to produce cracking of said members.

An object of the present invention comprises the provision of a novel and simple combustion chamber wall construction in which the connection between overlapping wall members is yieldable to accommodate unequal thermal expansion and contraction of said members without producing excessive stress in said connection as a result of said thermal expansion and contraction.

Other objects of the invention will become apparent upon reading the annexed detailed description in connection with the drawing in which:

Fig. 1 is an axial sectional view through the combustion chamber of a turbo jet engine embodying the invention;

Fig. 2 is a side view of the overlapping ends of a pair of adjacent annular wall members of the combustion chamber of Fig. 1; and Figs. 3, 4, 5 and 6 are sectional views taken along lines 3—3, 4—4, 5—5, and 6—6 respectively of Fig. 2.

Referring first to Fig. 1 of the drawing, reference numeral 10 designates a portion of a gas turbine engine for aircraft. As shown, the engine portion 10 comprises an annular air supply duct 12 to which compressed air is supplied from the engine air compressor (not illustrated). An annular combustion chamber 16 is disposed within the air duct 12. The combustion chamber 16 has a discharge opening at its downstream end with guide vanes 18 forming a nozzle construction for directing the combustion gases to the rotor blades 20 of a turbine rotor 22 for driving said rotor. The turbine rotor has a shaft 24 for driving the aforementioned compressor.

The combustion chamber 16 has a partition 26 across its upstream end through which a plurality of fuel supply pipes 28 extend. A plurality of cup shaped members 30 are secured to the partition 26, said members 30 having holes therethrough for supplying some air into the combustion chamber 16. As illustrated, the combustion chamber 16 is annular with the outer wall 32 of the combustion chamber comprising a plurality of serially-disposed overlapping annular wall or liner members. Similarly the inner wall 34 of the combustion chamber comprises a plurality of serially-disposed overlapping annular wall or liner members.

As illustrated, the liner members forming the inner and outer walls of the combustion chamber 16 may have openings such as 36 to admit air radially into the combustion chamber 16 from the portion of the air duct 12 surrounding said chamber. In addition, the annular liner members forming the inner and outer walls of the chamber 16 are connected together in radially-spaced overlapping relation for air flow axially into the chamber therebetween for cooling said liner members. Such an overlapping connection embodying the invention and broadly indicated at A in Fig. 1 for liner members 40 and 42 of the outer wall 32 is shown in detail in Figs. 2–6. The connections between the other annular liner members of the inner and outer walls of the combustion chamber 16 preferably are similar to the connection A.

Except for details of the connection A the aforedescribed gas turbine structure is conventional. As will be apparent the invention is also applicable to other combustion chambers having overlapping liner construction for the chamber walls.

Referring now to Figs. 2–6, the liner member 40 has a smaller diameter than that of the overlapping portion of the downstream liner member 42 to provide a space therebetween through which air flows into the combustion chamber 16 in a generally axial downstream direction.

The liner 42 has a plurality of circumferentially-spaced openings 44 therethrough adjacent to but spaced from its upstream end so as to leave an annular strip or band 46 at said upstream end. The openings 44 are sufficiently close together and sufficiently long in an axial direction so that the material of the liner 42 between each adjacent pair of said openings forms a finger-like strip 48 which is elongate in axial direction.

The portions of the end band 46 adjacent to the openings 44 are depressed to form indented portions 50 adapted to contact the adjacent overlapped liner member 40. Thus the end band 46 has a corrugated shape as best seen in Figs. 3 and 4. The bottoms of the indented portions 50 of the band 46 are secured to the liner 40 for example by spotwelding as indicated at 52.

With the aforedescribed construction of the connection A between the combustion chamber liner members 40 and 42 any radial expansion of the liner 40 relative to the liner 42 forces a corresponding expansion of the end band 46 of the liner 42. However the elongate fingers 48 flex to permit expansion of the liner 40 and the band 46 of the liner 42 without requiring a corresponding expansion of the adjacent main portion of the liner 42. This flexing of the elongate fingers 48 avoids the stresses which would otherwise be produced in the liners 40 and 42 adjacent to their connection A as a result of unequal thermal expansion of said liners.

Each finger 48 in effect constitutes a beam having its downstream end connected to the main portion of the liner 42 and having its upstream end connected to the band 46 at the upstream end of said liner. The main portion of the liner 42 to which the beams 48 are connected is a continuous cylinder of substantial axial depth so that the end of each beam 48 connected to said main liner portion has a substantially fixed or built in construction. On the other hand, the corrugated band 48, to which the other end of each beam 48 is connected, provides said end with only a partially fixed or built in construction because of the corrugated construction of said band and because of its relatively narrow axial width. With the beams 48 being less fixed or built in at their upstream ends than at their downstream ends, it can be shown that the maximum stress in said beams resulting from unequal expansion or contraction of the liners 40 and 42 can be lowered by giving the beams a tapering width such that, as illustrated, the width of the beams is a maximum at their relatively fixed or built in ends. For this purpose, in a particular connection A the magnitude of the taper depends on the extent to which the upstream ends of the beams 48 deviate from fixed or built in ends in that the taper of the beams 48 should be greater in a connection A having a less fixed or built in construction for the upstream ends of said beams as compared to a connection A in which said upstream beam ends are more fixed. Preferably each beam 48 has such a taper that the ratio of the upstream width of said beam to its downstream width is at least 0.2.

Preferably, as best seen in Fig. 6, the upstream liner 40 extends downstream beyond the openings 44 so that the air enters axially between the liners. However if radial flow of air into the combustion chamber is desired at the connection between the liners 40 and 42 then the liner 40 could be cut back to uncover said openings 44.

The connection between each pair of overlapping liners for the inner wall 34 of the combustion chamber 16 preferably is similar to the connection A described in connection with a pair of overlapping liners 40 and 42 for the outer wall 32. It should be noted that in case of the inner combustion chamber wall 34, the downstream liner of each pair of overlapping liners, although having the smaller diameter, is the outer liner of the pair relative to the combustion chamber.

The invention has been illustrated in connection with a combustion chamber of annular construction. Gas turbine combustion chambers having a circular cross-sectional area are also known and it is obvious that the invention is equally applicable to such circular combustion chambers.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

Combustion chamber structure comprising a pair of serially-disposed annular wall members for said chamber having their adjacent ends disposed in spaced overlapping relation to permit air flow therebetween, the outer of said annular members relative to said chamber having a plurality of circumferentially-spaced openings adjacent to but spaced from its said overlapping end such as to leave an annular band at said end and to leave sections between said openings connecting said annular band with the remainder of said outer member, the shape and spacing of said openings being such that the section between a pair of adjacent openings has a length in an axial direction which is substantially greater than the maximum width of said section between said openings and such that each said section is tapered so that it has a smaller circumferential width at its annular band end than at its other end such that the ratio of the width of each said section at its annular band end to its width at its other end is at least 0.2; and a like plurality of circumferentially-spaced depressions in said annular band to form said band into a corrugated shape with the bottoms of said depressions secured to the other of said members and with each said depression being disposed upstream of one of said openings, the inner of said annular members extending a substantial axial distance downstream of said openings.

References Cited in the file of this patent
UNITED STATES PATENTS
2,645,081    McDonald _____ July 14, 1953